(12) United States Patent
Aoyama et al.

(10) Patent No.: US 9,406,322 B2
(45) Date of Patent: Aug. 2, 2016

(54) GRADED SIDE SHIELD GAP READER

(71) Applicant: HGST Netherlands B.V., Amsterdam (NL)

(72) Inventors: Jun Aoyama, Kanagawa-Ku (JP); Masahiko Hatatani, Kamakura (JP); Hiroyuki Katada, Odawara (JP); Masato Shiimoto, Odawara (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/850,984

(22) Filed: Sep. 11, 2015

(65) Prior Publication Data

US 2016/0005428 A1    Jan. 7, 2016

Related U.S. Application Data

(62) Division of application No. 14/043,219, filed on Oct. 1, 2013, now abandoned.

(51) Int. Cl.
*G11B 5/39* (2006.01)
*G11B 5/11* (2006.01)

(52) U.S. Cl.
CPC ............... *G11B 5/3912* (2013.01); *G11B 5/11* (2013.01); *G11B 5/398* (2013.01)

(58) Field of Classification Search
CPC .. G11B 5/3116; G11B 5/3909; G11B 5/3929; G11B 5/398; G11B 5/11
USPC ....................................... 360/324–324.2, 319
See application file for complete search history.

(56) References Cited

U.S. PATENT DOCUMENTS

| | | |
|---|---|---|
| 6,445,552 B1 | 9/2002 | Gill |
| 6,456,465 B1 | 9/2002 | Louis et al. |
| 6,456,467 B1 | 9/2002 | Mao et al. |
| 6,510,030 B1 | 1/2003 | Song et al. |
| 6,512,661 B1 | 1/2003 | Louis |
| 6,680,829 B2 | 1/2004 | Chen et al. |
| 6,943,993 B2 | 9/2005 | Chang et al. |
| 6,980,403 B2 | 12/2005 | Hasegawa |
| 7,002,775 B2 | 2/2006 | Hsu et al. |
| 7,061,732 B2 | 6/2006 | Yoshikawa et al. |
| 7,280,325 B1 | 10/2007 | Pan |

(Continued)

FOREIGN PATENT DOCUMENTS

| | | |
|---|---|---|
| JP | 2004-127480 A | 4/2004 |
| JP | 2008-176857 A | 7/2008 |

OTHER PUBLICATIONS

Nakamoto, et al.; Single-Pole/TMR Heads for 140-Gb/in2 Perpendicular Recording; IEEE Transactions on Magnetics; vol. 40, No. 1; dated Jan. 2004; 5 total pages.

(Continued)

*Primary Examiner* — Will J Klimowicz
(74) *Attorney, Agent, or Firm* — Patterson & Sheridan, LLP

(57) ABSTRACT

Embodiments of the present invention generally include magnetoresistive heads, such as read heads, having a sensor structure and side shields disposed adjacent to the sensor structure. The distance between the side shields and the sensor structure increase in a direction from an ABS in the off-track direction. The magnetoresistive heads may include tapered surfaces on the side shields or sensor structure, or may include stepped surfaces on the side shields or sensor structure.

15 Claims, 7 Drawing Sheets

(56) References Cited

U.S. PATENT DOCUMENTS

| | | | |
|---|---|---|---|
| 7,379,277 | B2 | 5/2008 | Burbank et al. |
| 7,446,979 | B2 | 11/2008 | Jayasekara |
| 7,515,381 | B2 | 4/2009 | Baer et al. |
| 7,574,791 | B2 | 8/2009 | Araki et al. |
| 7,599,151 | B2 | 10/2009 | Hatatani et al. |
| 7,869,165 | B2 | 1/2011 | Miyauchi et al. |
| 7,876,534 | B2 | 1/2011 | Chou et al. |
| 7,894,159 | B2 | 2/2011 | Lengsfield, III et al. |
| 8,120,874 | B2 | 2/2012 | Hsiao et al. |
| 8,208,230 | B2 | 6/2012 | Liu |
| 8,437,106 | B2 | 5/2013 | Yanagisawa et al. |
| 8,451,562 | B2 | 5/2013 | Pentek et al. |
| 8,514,526 | B2 | 8/2013 | Ito et al. |
| 8,576,518 | B1 | 11/2013 | Zeltser et al. |
| 8,630,068 | B1 | 1/2014 | Mauri et al. |
| 8,675,315 | B2 | 3/2014 | Scholz et al. |
| 8,711,526 | B2 | 4/2014 | Colak et al. |
| 8,896,971 | B2 | 11/2014 | Boonstra |
| 2003/0076635 | A1* | 4/2003 | Morinaga .............. B82Y 10/00 360/324.12 |
| 2004/0100737 | A1 | 5/2004 | Nakamoto et al. |
| 2006/0250726 | A1 | 11/2006 | Lille |
| 2009/0109578 | A1 | 4/2009 | Nishikawa |
| 2009/0174968 | A1 | 7/2009 | Singleton et al. |
| 2009/0257153 | A1 | 10/2009 | Liu |
| 2009/0290265 | A1 | 11/2009 | Kane |
| 2010/0302688 | A1 | 12/2010 | Shiimoto et al. |
| 2011/0007426 | A1 | 1/2011 | Qiu et al. |
| 2011/0215800 | A1 | 9/2011 | Zhou et al. |
| 2011/0262744 | A1 | 10/2011 | Hatanaka et al. |
| 2012/0134057 | A1 | 5/2012 | Song et al. |
| 2013/0065084 | A1 | 3/2013 | Dimitrov et al. |

OTHER PUBLICATIONS

Haginoya, et al.; Side-Shielded Tunneling Magnetoresistive Read Head for High-Density Recording; IEEE Transactions on Magnetics; vol. 40, No. 4; dated Jul. 2004, 3 total pages.

Zheng, et al.; Side Shielded TMR Reader with Track-Width-Reduction Scheme; IEEE Transactions on Magnetics; vol. 42, No. 10; dated Oct. 2006; 3 total pages.

\* cited by examiner

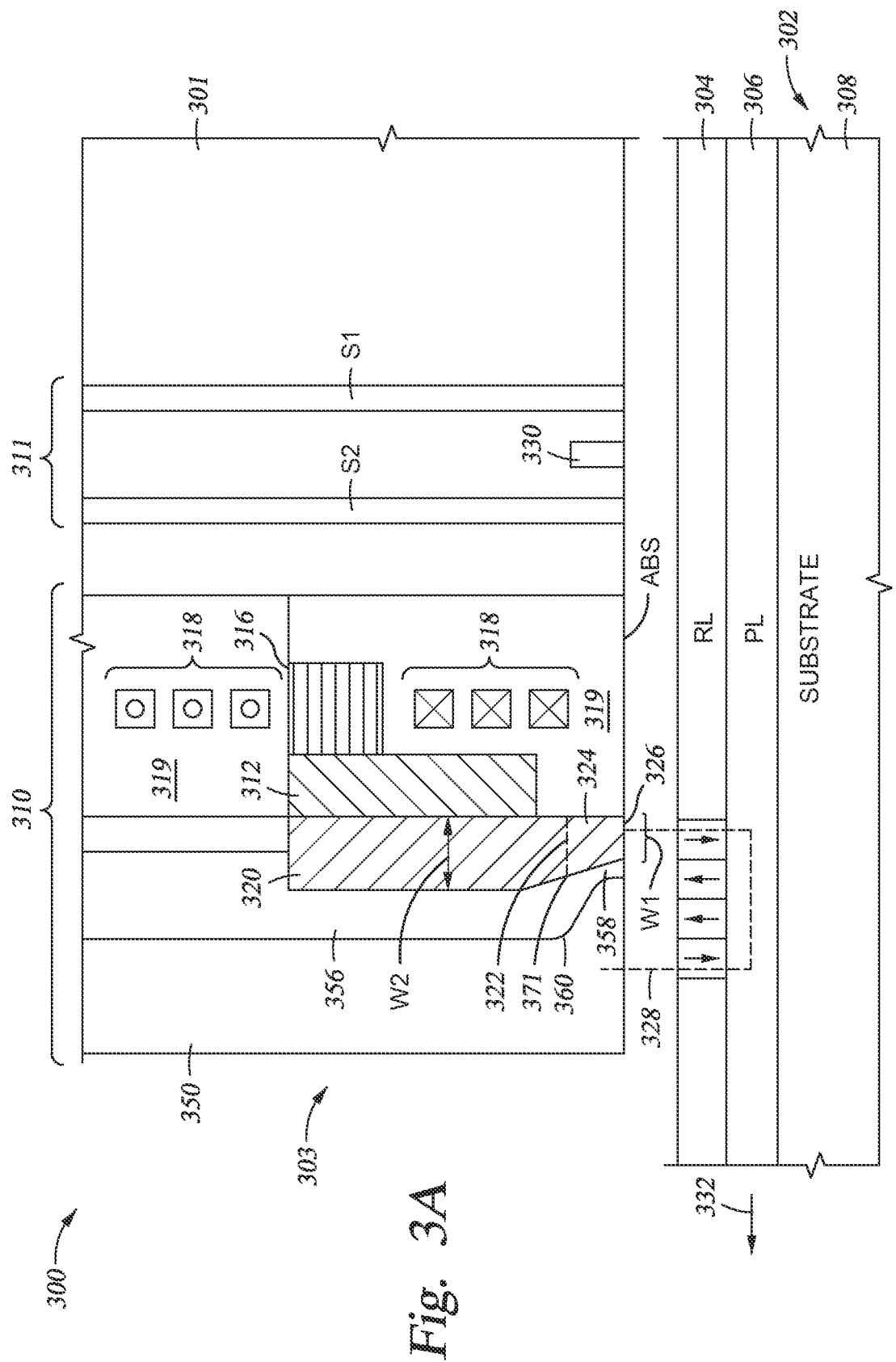

GRADED SIDE SHIELD GAP READER

CROSS-REFERENCE TO RELATED APPLICATIONS

This application is a divisional of co-pending U.S. patent application Ser. No. 14/043,219, filed Oct. 1, 2013, which is herein incorporated by reference.

BACKGROUND OF THE INVENTION

1. Field of the Invention

Embodiments of the present invention generally relate to a magnetic read head for use in a hard disk drive, in particular, a magnetoresistive effect read head having a side shield.

2. Description of the Related Art

The heart of a computer is a magnetic disk drive which typically includes a rotating magnetic disk, a slider that has read and write heads thereon, a suspension arm above the rotating disk and an actuator arm that swings the suspension arm to position the read and/or write heads over selected data tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing, the write and read heads are employed for writing magnetic impressions to and reading magnetic signal fields from the rotating disk. The read and write heads are connected to processing circuitry that operates according to a computer program to implement the writing and reading functions.

The read head of a hard disk drive includes a spin valve element utilizing a magnetoresistive effect. By sensing the relative magnetizations of two ferromagnetic thin films sandwiching an intermediate layer, magnetic information can be read from nanoscale magnets on a recording medium. Reductions in various dimensions of the sensor element and improvements in the film characteristics have contributed to improvements in recording density, allowing current recording tracks to achieve a width less than approximately 100 nanometers. However, further improvements in recording density using previously known devices have proven to be difficult.

In response, one proposed solution to further increase recording density is the side shield read head. The side shield read head includes a soft magnetic body in the track width direction of the spin valve element, thus leading to sensitivity reduction at the skirt region of the read sensitivity distribution in the track width direction. The skirt reduction of the read sensitivity distribution occurs because the spin valve element captures the magnetic field generated at the center part of the recording track, and the magnetic shield formed by a soft magnetic body absorbs the magnetic field generated by portions of the recording track other than the center part. By reducing the skirt of the sensitivity distribution, the track density can be improved because the reading noise and interference of adjacent tracks can be reduced.

In previously known side shield read heads, adequate signal output cannot be obtained because of read utilization decreases, as explained with reference to FIGS. 1A and 1B. FIG. 1A is a partial perspective view of a magnetic head 100 having side shields 102 and a sensor element 103. FIG. 1B is a top view of the spin valve element 100 shown in FIG. 1A. When there is no magnetic field from the recording medium 106, the magnetization direction in the side shield 102 is horizontal; consequently, the magnetization direction of the soft bias magnetic field is also horizontal. As shown in FIG. 1B, when the side shield 102 absorbs a magnetic field 110 from the recording medium 106, the magnetization direction in the side shield 102 is tilted in the direction of the magnetic field 110, as shown by arrows 108. As a result, the soft bias magnetic field has a component in the element height direction, e.g., magnetic field 115. The magnetic field 115 acts to suppress tilting of the magnetization of a free layer in the sensor structure 103. As shown in FIG. 1B, the tilt angle from horizontal direction of the magnetization direction in a free layer, as shown by arrow 114, is smaller than that of the magnetization direction without the magnetic field 115, as shown by broken arrow 116. This results in a decrease of the read utilization of the read sensor.

When the read utilization decreases, the read output also decreases, and a high signal-to-noise ratio (SNR) cannot be obtained. If the gap between the free layer and the side shield widens, the bias strength decreases and the utilization improves, however, the effect of a sensitivity reduction in the skirt region of the read sensitivity distribution is hindered (and consequently, noise reduction is hindered).

Therefore, there is a need in the art for a read head with both higher read utilization and a sensitivity reduction in the skirt region of the read sensitivity distribution.

SUMMARY OF THE INVENTION

Embodiments of the present invention generally include magnetoresistive heads, such as read heads, having a sensor structure and side shields disposed adjacent to the sensor structure. The distance between the side shields and the sensor structure increase in a direction from an ABS in the off-track direction. The magnetoresistive heads may include tapered surfaces on the side shields or sensor structure, or may include stepped surfaces on the side shields or sensor structure.

In one embodiment, a magnetoresistive head comprises a sensor structure, a first side shield disposed on a first side of the sensor structure, a second side shield disposed on a second side of the sensor structure, wherein the first side shield is spaced from the sensor structure by a first distance at an air bearing surface and a second distance at a location spaced from the air bearing surface, wherein the second distance is greater than the first distance, and wherein the distance between the first side shield and the sensor structure tapers from the ABS to the location spaced from the air bearing surface.

In another embodiment, a magnetoresistive head comprises a sensor structure, a first side shield disposed on a first side of the sensor structure, wherein an edge of the first side shield adjacent the sensor structure forms a stepped surface, and a second side shield disposed on a second side of the sensor structure, wherein an edge of the second side shield adjacent the sensor structure forms a stepped surface.

In another embodiment, a magnetoresistive head comprises a sensor structure having a first edge on a first side thereof and a second edge on a side thereof, the first edge parallel to the second edge, a first side shield disposed on the first side of the sensor structure, the first side shield having an edge with a first portion parallel to the first edge of the sensor structure and a second portion angled with respect to the first edge of the sensor structure, a second side shield disposed on the second side of the sensor structure, the second side shield having an edge with a first portion parallel to the second edge of the sensor structure and a second portion angled with respect to the second edge of the sensor structure, wherein a distance between the first edge of the sensor structure and the first portion of the first side shield is less than the gap between the first edge of the sensor structure and the second portion of the first side shield, and wherein a distance between the second edge of the sensor structure and the first portion of the second side shield is less than the gap between the second edge of the sensor structure and the second portion of the second side shield.

In another embodiment, a magnetoresistive head comprises a sensor structure having a first edge on a first side thereof and a second edge on a side thereof, each of the first edge and the second edge having a first portion parallel with one another and a second portion disposed at an angle with respect to the first portions, a first side shield disposed on the first side of the sensor structure, the first side shield having a first edge parallel with the first portion of the first edge of the sensor structure, a second side shield disposed on the second side of the sensor structure, the second side shield having a first edge parallel with the first portion of the second edge of the sensor structure, wherein a distance between the first edge of the first side shield and the first portion of the first edge of the sensor structure is less than the gap between the first edge of the first side shield and the second portion of the first edge of the sensor structure, and wherein a distance between the first edge of the second side shield and the first portion of the second edge of the sensor structure is less than the gap between the first edge of the second side shield and the second portion of the second edge of the sensor structure.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3A is a side view of a read/write head and magnetic disk of the disk drive of FIG. 2, according to one embodiment of the invention.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally include magnetoresistive heads, such as read heads, having a sensor structure and side shields disposed adjacent to the sensor structure. The distance between the side shields and the sensor structure increase in a direction from an ABS in the off-track direction. The magnetoresistive heads may include tapered surfaces on the side shields or sensor structure, or may include stepped surfaces on the side shields or sensor structure.

Figure 1A:
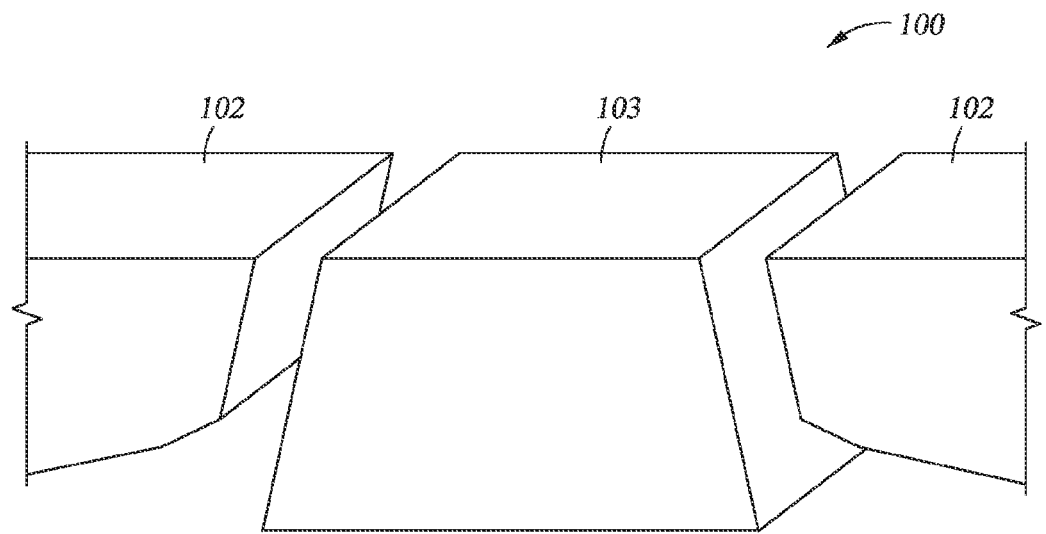
FIGS. 1A and 1B illustrate partial side and top views of a magnetic head.
Figure 1B:
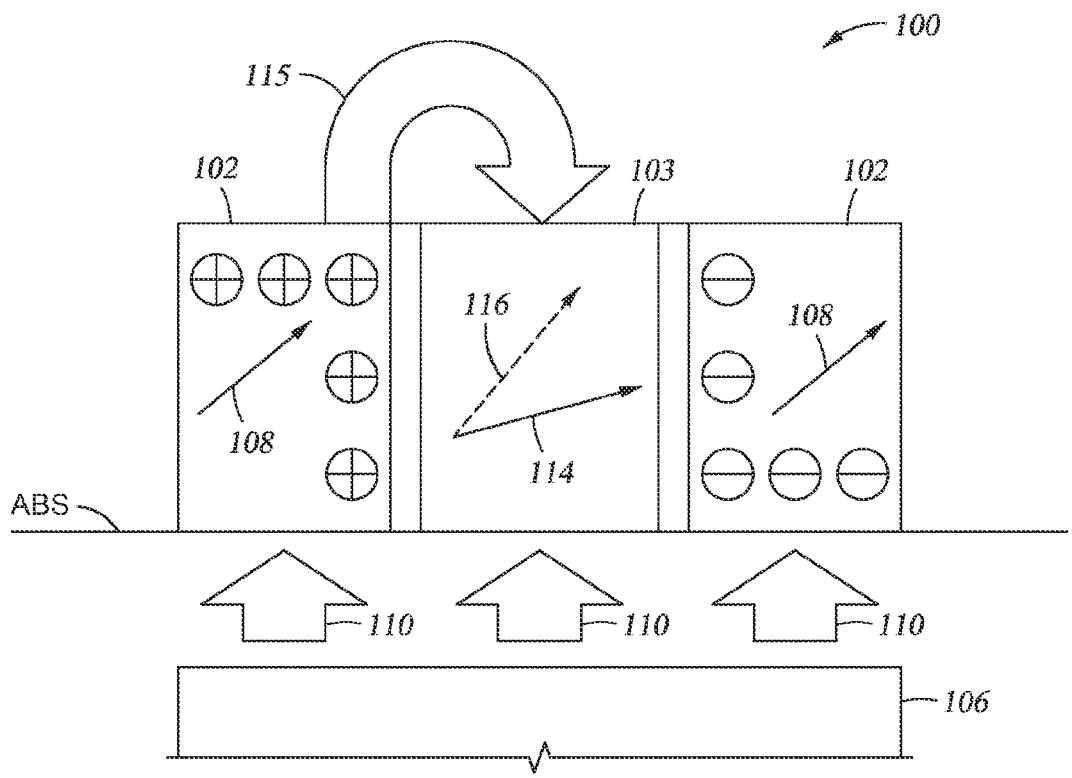
Figure 2:
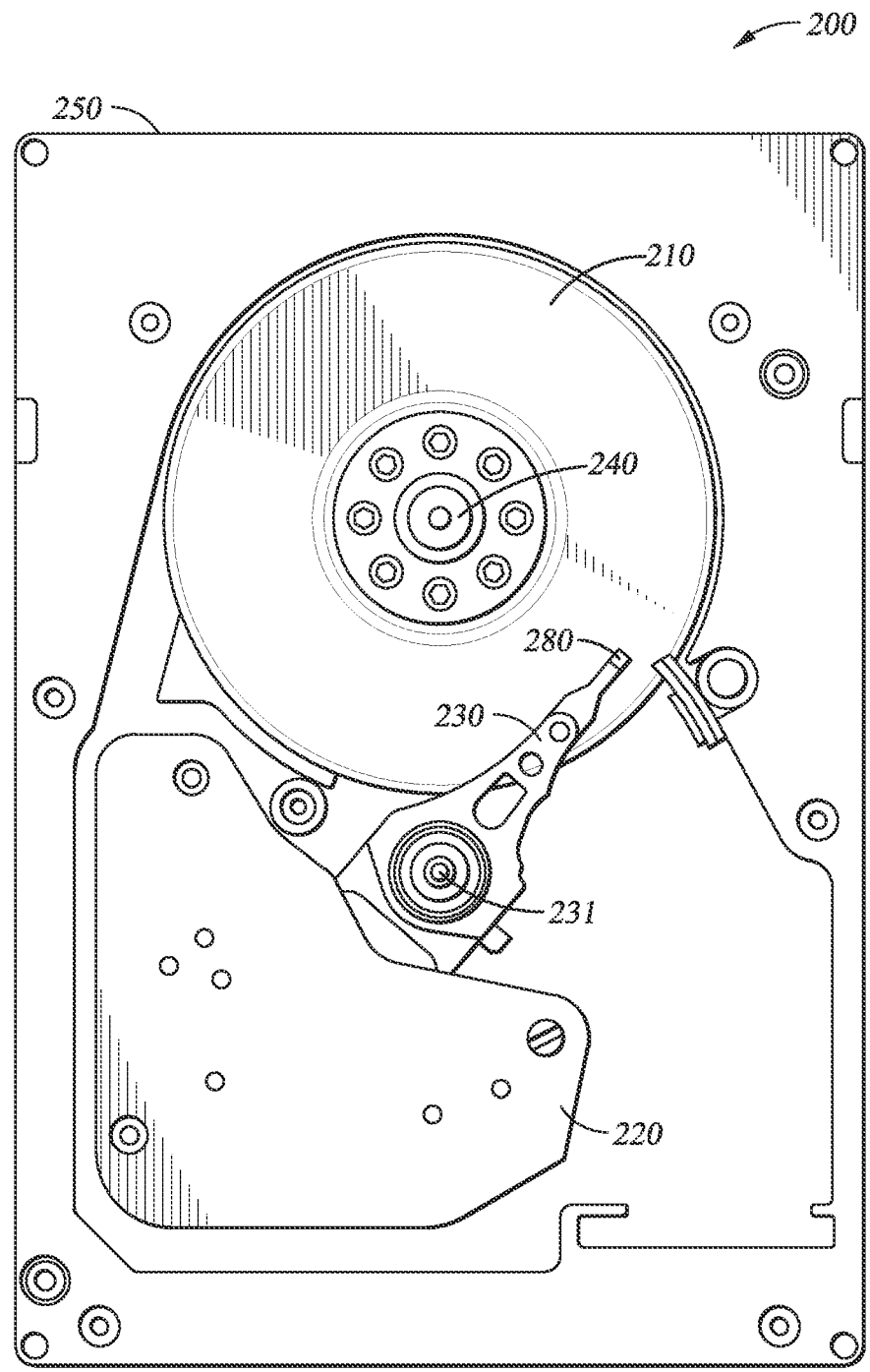
FIG. 2 illustrates an exemplary magnetic disk drive, according to an embodiment of the invention.

FIG. 2 illustrates a top view of an exemplary hard disk drive (HDD) 200, according to an embodiment of the invention. As illustrated, HDD 200 may include one or more magnetic disks 210, actuator 220, actuator arms 230 associated with each of the magnetic disks, and spindle motor 240 affixed in a chassis 250. The one or more magnetic disks 210 may be arranged vertically as illustrated in FIG. 2. Moreover, the one or more magnetic disks may be coupled with the spindle motor 240.

Magnetic disks 210 may include tracks of data on both the top and bottom surfaces of the disk. A magnetic head 280 mounted on a slider may be positioned on a track. As each disk spins, data may be written on and/or read from the data track. Magnetic head 280 may be coupled to an actuator arm 230 as illustrated in FIG. 2. Actuator arm 230 may be configured to swivel around actuator axis 231 to place magnetic head 280 on a particular data track.

FIG. 3A is a fragmented, cross-sectional side view through the center of a read/write head 300 mounted on a slider 301 and facing magnetic disk 302. The read/write head 300 and magnetic disk 302 may correspond to the magnetic head 280 and magnetic disk 210, respectively in FIG. 2. In some embodiments, the magnetic disk 302 may be a "dual-layer" medium that includes a perpendicular magnetic data recording layer (RL) 304 on a "soft" or relatively low-coercivity magnetically permeable underlayer (PL) 306 formed on a disk substrate 308. The read/write head 300 includes an ABS, a magnetic write head 310 and a magnetic read head 311, and is mounted such that its ABS is facing the magnetic disk 302. In FIG. 3A, the disk 302 moves past the write head 310 in the direction indicated by the arrow 332, so the portion of slider 301 that supports the read/write head 300 is often called the slider "trailing" end 303.

In some embodiments, the magnetic read head 311 is a MR read head that includes an MR sensing element 330 located between MR shields S1 and S2. In other embodiments, the magnetic read head 311 is a MTJ read head that includes a MTJ sensing device 330 located between MR shields S1 and S2. The RL 304 is illustrated with perpendicularly recorded or magnetized regions, with adjacent regions having magnetization directions, as represented by the arrows located in the RL 304. The magnetic fields of the adjacent magnetized regions are detectable by the MR (or MTJ) sensing element 330 as the recorded bits.

The write head 310 includes a magnetic circuit made up of a main pole 312 and a yoke 316. The write head 310 also includes a thin film coil 318 shown in the section embedded in non-magnetic material 319 and wrapped around yoke 316. In an alternative embodiment, the yoke 316 may be omitted, and the coil 318 may wrap around the main pole 312. A write pole 320 is magnetically connected to the main pole 312 and has an end 326 that defines part of the ABS of the magnetic write head 310 facing the outer surface of disk 302.

Write pole 320 is a flared write pole and includes a flare point 322 and a pole tip 324 that includes an end 326 that defines part of the ABS. The flare may extend the entire height of write pole 320 (e.g., from the end 326 of the write pole 320 to the top of the write pole 320), or may only extend from the flare point 322, as shown in FIG. 3A. In one embodiment the distance between the flare point 322 and the ABS is between about 30 nm and about 150 nm.

The write pole 320 includes a tapered surface 371 which increases a width of the write pole 320 from a first width W1 at the ABS to a second width W2 away from the ABS. In one embodiment, the width W1 may be between around 60 nm and 200 nm, and the width W2 may be between around 120 nm and 350 nm. While the tapered region 371 is shown with a single straight surface in FIG. 3A, in alternative embodiment, the tapered region 371 may include a plurality of tapered surfaces with different taper angles with respect to the ABS.

The tapering improves magnetic performance. For example, reducing the width W1 at the ABS may concentrate a magnetic field generated by the write pole 320 over desirable portions of the magnetic disk 302. In other words, reducing the width W1 of the write pole 320 at the ABS reduces the probability that tracks adjacent to a desirable track are erroneously altered during writing operations.

While a small width of the write pole 320 is desired at the ABS, it may be desirable to have a greater width of the write pole 320 in areas away from the ABS. A larger width W2 of the write pole 320 away from the ABS may desirably increase the magnetic flux to the write pole 320, by providing a greater thickness of the write pole 320 in a direction generally parallel to the ABS. In operation, write current passes through coil 318 and induces a magnetic field (shown by dashed line 328) from the write pole 320 that passes through the RL 304 (to magnetize the region of the RL 304 beneath the write pole 320), through the flux return path provided by the PL 306, and back to an upper return pole 350. In one embodiment, the greater the magnetic flux of the write pole 320, the greater is the probability of accurately writing to desirable regions of the RL 304.

FIG. 3A further illustrates one embodiment of the upper return pole or magnetic shield 350 that is separated from write pole 320 by a nonmagnetic gap layer 356. In some embodiments, the magnetic shield 350 may be a trailing shield wherein substantially all of the shield material is on the trailing end 303. Alternatively, in some embodiments, the magnetic shield 350 may be a wrap-around shield wherein the shield covers the trailing end 303 and also wraps around the sides of the write pole 320. As FIG. 3A is a cross section through the center of the read/write head 300, it represents both trailing and wrap-around embodiments.

Near the ABS, the nonmagnetic gap layer 356 has a reduced thickness and forms a shield gap throat 358. The throat gap width is generally defined as the distance between the write pole 320 and the magnetic shield 350 at the ABS. The shield 350 is formed of magnetically permeable material (such as Ni, Co and Fe alloys) and gap layer 356 is formed of nonmagnetic material (such as Ta, TaO, Ru, Rh, NiCr, SiC or $Al_2O_3$). A taper 360 in the gap material provides a gradual transition from the throat gap width at the ABS to a maximum gap width above the taper 360. This gradual transition in width forms a tapered bump in the non-magnetic gap layer that allows for greater magnetic flux density from the write pole 320, while avoiding saturation of the shield 350.

It should be understood that the taper 360 may extend either more or less than is shown in FIG. 3A. The taper may extend upwards to an end of shield 350 opposite the ABS (not shown), such that the maximum gap width is at the end of the shield opposite the ABS. The gap layer thickness increases from a first thickness (the throat gap width) at the ABS to greater thicknesses at a first distance from the ABS, to a greatest thickness at a second distance (greater than the first distance) from the ABS.

Figure 3B:
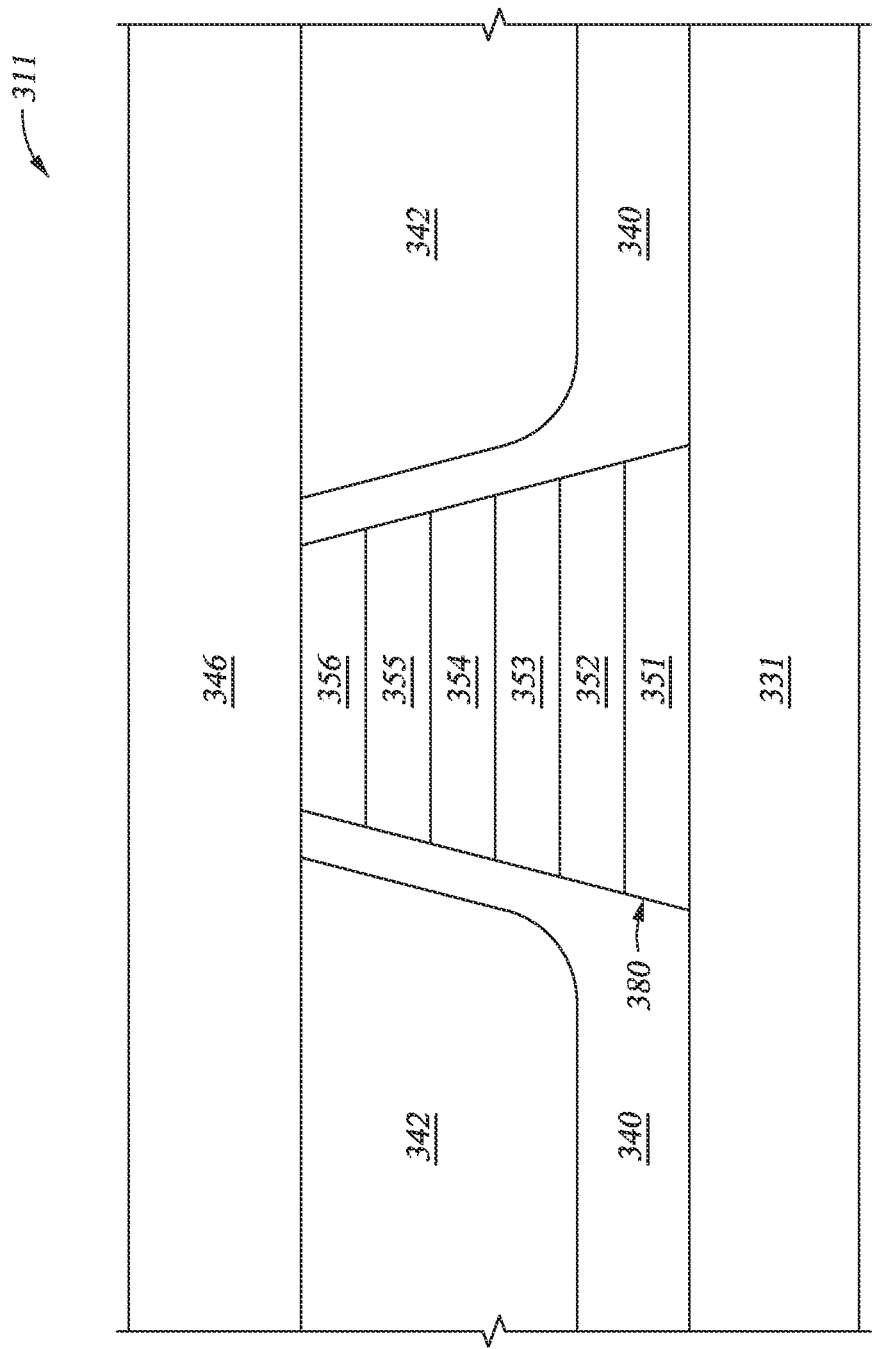
FIG. 3B is a schematic cross-sectional view of portions of a magnetic head according to one embodiment.

FIG. 3B is a schematic cross-sectional view of portions of magnetic head 311 according to one embodiment. The thickness of each layer, and the width of each layer, are for example only, and each layer may be thicker/thinner and/or wider/narrower. The magnetic head 311 includes an optional first shield layer 331. The first shield layer 331 may comprise a ferromagnetic material. Suitable ferromagnetic materials that may be utilized include Ni, Fe, Co, NiFe, NiFeCo, NiCo, CoFe and combinations thereof The magnetic head 311 also includes a sensor structure 380, such as a tunnel magnetoresistive (TMR) element, comprising an under layer 351, an antiferromagnetic layer 352, a pinned magnetic layer 353, an insulation layer 354, a free layer 355 and a gap layer 356. The pinned magnetic layer 353 may be one of several types of pinned layers, such as a simple pinned, antiparallel pinned, self pinned or antiferromagnetic pinned sensor.

The under layer 351 may include one or more of tantalum (Ta) or ruthenium (Ru) and may have a thickness of about 3 nanometers. The antiferromagnetic layer 352 may include IrMn and have a thickness of about 2 to about 6 nanometers, such as about 4 nanometers. The pinned magnetic layer 353 may include CoFe and may have a thickness of about 1 to about 4 nanometers, such as about 2 nanometers. The insulation layer 354 may have a thickness of about 0.5 to about 3 nanometers, such as about 1 nanometer and may be formed from MgO. The free layer 355 may include one or more of CoFe, CoFeB, or CoFeNiB, and may have a thickness of about 2 to about 10 nanometers, such as about 6 nanometers. The gap layer 356 includes one or more of Ta and Ru and may have a thickness of about 2 to about 6 nanometers, such as about 4 nanometers. The second shield layer 346 may comprise a ferromagnetic material. Suitable ferromagnetic materials that may be utilized include Ni, Fe, Co, NiFe, NiFeCo, NiCo, CoFe and combinations thereof. In one example, the upper shield layer 346 includes a three layer structure of NiFe, Ru, and NiFe.

The magnetic head 311 may also include an insulating layer 340 deposited on the first shield layer 331 as well as on the sidewalls of the sensor structure 380. The insulating layer 340 may comprise an insulating material such as aluminum oxide. The insulating layer 340 may be deposited by atomic layer deposition (ALD), chemical vapor deposition (CVD), sputtering, and the like. Side shield layers 342 are deposited over the insulating layers 340. The side shield layers 342 may include one or more of NiFe, CoFe, and NiCoFe. Alternatively, the side shield layers 342 may include a three layer structure including a first layer of NiFe, a second layer of Ru, and third layer of NiFe.

Figure 4A:
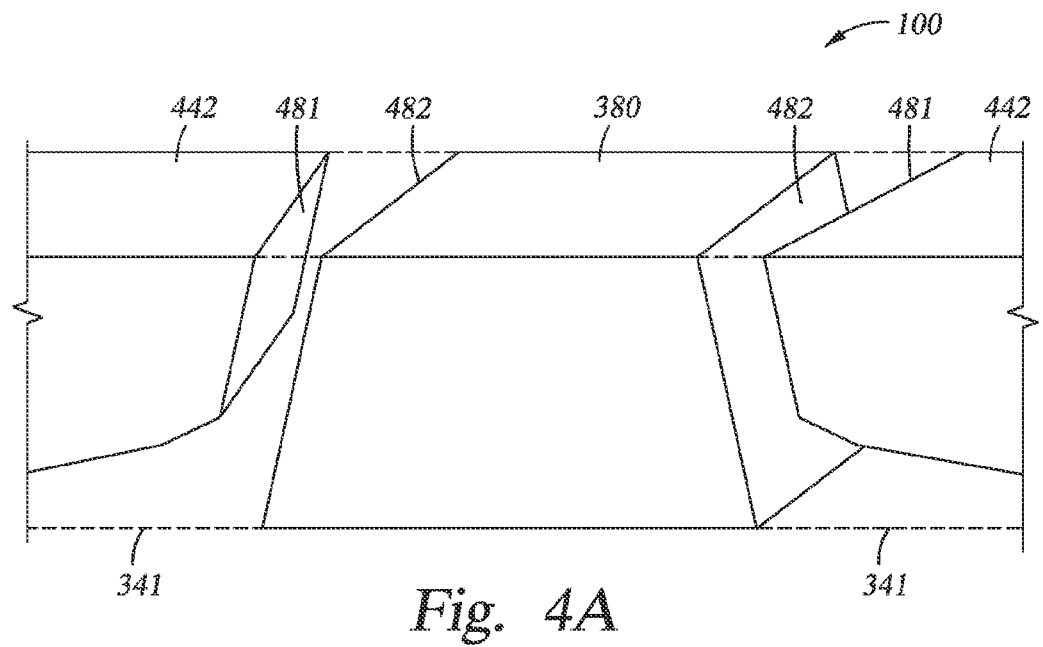
FIG. 4A is a partial perspective view of a magnetic head according to one embodiment of the invention.
Figure 4B:
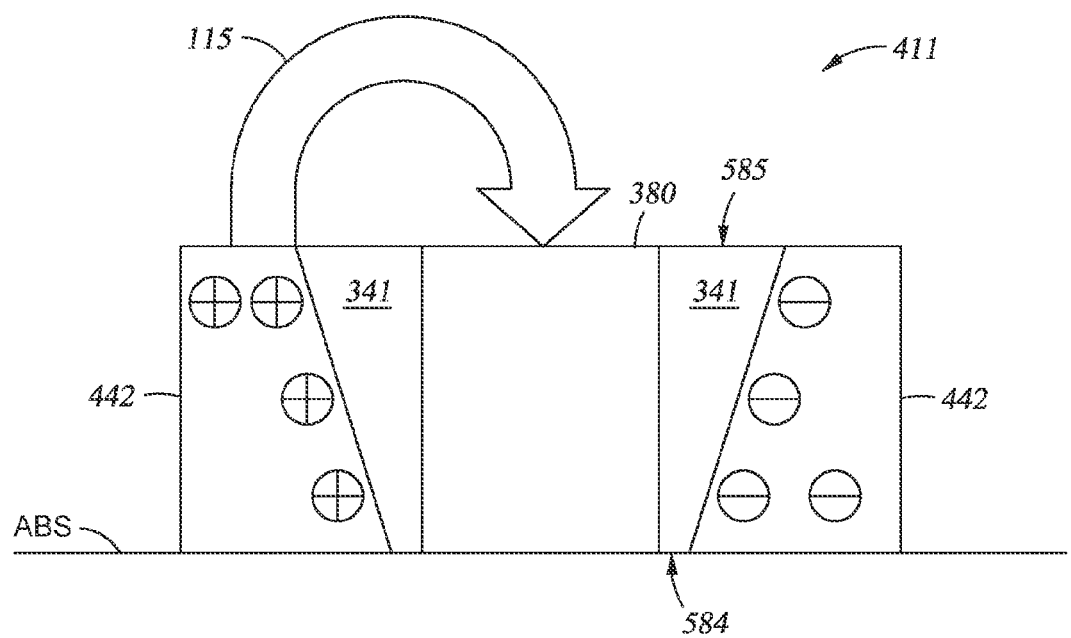
FIG. 4B is a top view of the magnetic head shown in FIG. 4A.

FIG. 4A is a partial perspective view of a read/write head 411 according to one embodiment of the invention. FIG. 4B is a top view of the read/write head shown in FIG. 4A. The read/write head 411 includes a sensor structure 380, side shields 442, and insulating layers 341 disposed in a gap between the sensor structure 380 and each of the side shields 442. The insulating layers 341 are shown in phantom to facilitate illustration of the side shields 442. As illustrate in FIGS. 4A and 4B, the edges 481 of the side shields 442 are not parallel with respect to the edges 482 of the sensor structure 380, but rather, are angled with respect thereto to form a tapered shape therebetween. In the embodiment shown in FIGS. 4A and 4B, the edges 481 of the side shields 442 are tapered such that distance between the side shields 442 and the sensor structure 380 is smallest adjacent to the ABS at gap 584, and increases in a direction away from the ABS. Thus, gap 585 is greater than gap 584.

In prior art approaches, the gap 584 is generally equal to the gap 585. Such devices are limited to either a reduced skirt ratio (e.g., reduced noise) or increased read output, but not both. The skirt ratio is an index showing the spread of the sensitivity of the skirt. The skirt ratio is defined as the sensitivity width in the off track direction when the read sensitivity becomes 10% of the maximum value divided by the sensitivity width when the read sensitivity becomes 50% of the maximum value. Consequently, by reducing the skirt, the skirt ratio becomes smaller.

However, as described herein, the tapered or variable edge distances between the side shield 442 and the sensor structure 380 facilitate both a reduced skirt ratio and increased read output. For example, the reduced gap 584 facilitates a reduction in skirt ratio, while the relatively larger gap 585 facilitates increased read output. It is believed that the reduction in the skirt ratio is due to an increase in the strength of a side shield effect due to the relatively smaller distance of the gap 584. It is also believed that the increased read output is due to a decrease in the strength of the magnetic field 115 due to the relatively greater distance of the gap 585. As the gap 585 increases, the read output also increases. Conversely, as the gap 584 decreases, the skirt ratio decreases. By keeping the gap 584 relatively small with respect to the gap 585, a reduction in skirt ratio can be maintained while simultaneously increasing read output (e.g., due to the relatively increased width of gap 585), unlike prior art approaches in which gaps 584 and 585 have approximately equal widths and thus benefit from only one of increased output or reduced skirt ratio. As illustrated in FIG. 4B, the taper of the edge 481 begins at the ABS.

In one example, the sensor structure 380 may have a width of about 28 nanometers and height of about 45 nanometers. In such an example, the ratio of the width of gap 585 to gap 584 may be about 5. In one embodiment, the gap 584 may have a width of about 2 nanometers to about 8 nanometers. In another example, the ratio of gap 584 to gap 585 may be between about 2 and about 8. In such an example, the read output increases as the ratio of gap 584 to gap 585 approaches 5, and then decreases between about 5 and about 8. The decrease of the read output may be due to the increase of the soft bias strength because of the concentration of the magnetic charge in the side shields 242 near the ABS adjacent to the gap 584.

Figure 5A:
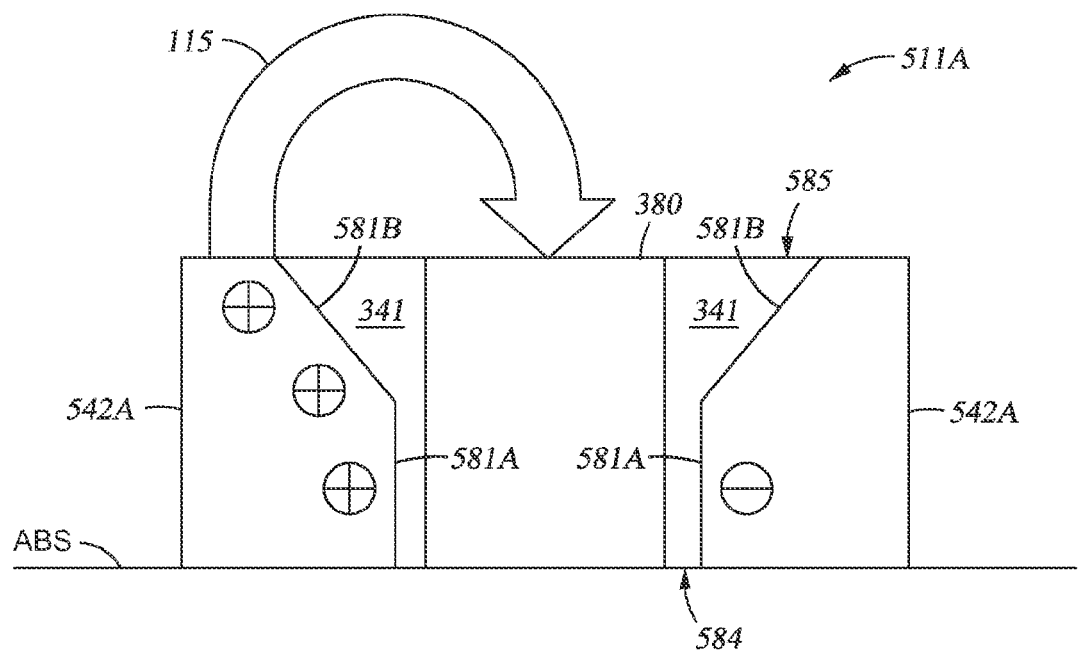
FIGS. 5A-5D are partial views of magnetic heads according to other embodiments of the invention.

FIGS. 5A-5D are partial views of read/write heads 511A-511D according to other embodiments of the invention. FIG. 5A illustrates a read/write head 511A having a sensor structure 380, side shields 542A, and an insulating layer 341 disposed therebetween. The side shields 542A are similar to the side shields 442, but are shaped differently on edges adjacent to the sensor structure 380. The side shields 542A include a first edge portion 581A having an edge generally parallel to the edge to an edge 482 of the sensor 380, and a second edge portion 581B having a tapered surface with respect to the edge 482 of the sensor structure 380. The first edge portion 581A is positioned relatively close to the sensor structure 380 forming a gap 584 therebetween, which may be filled with an insulating layer 341. The relatively close proximity of the sensor structure 380 to the first edge portion 581A facilitates a reduction in a skirt ratio. The second edge portion 581B tapers away from the sensor 380, thus creating a gap 585 between the sensor 380 and the side shields 542A. The gap 585 is greater than the gap 584 and facilitates increased read output. The transition point from the edge 581A to the edge 581B may occur at a point between about 20 percent to about 80 percent of the length of the sides shields 542A; for example, at about the half way (e.g., 50 percent) point.

Figure 5B:
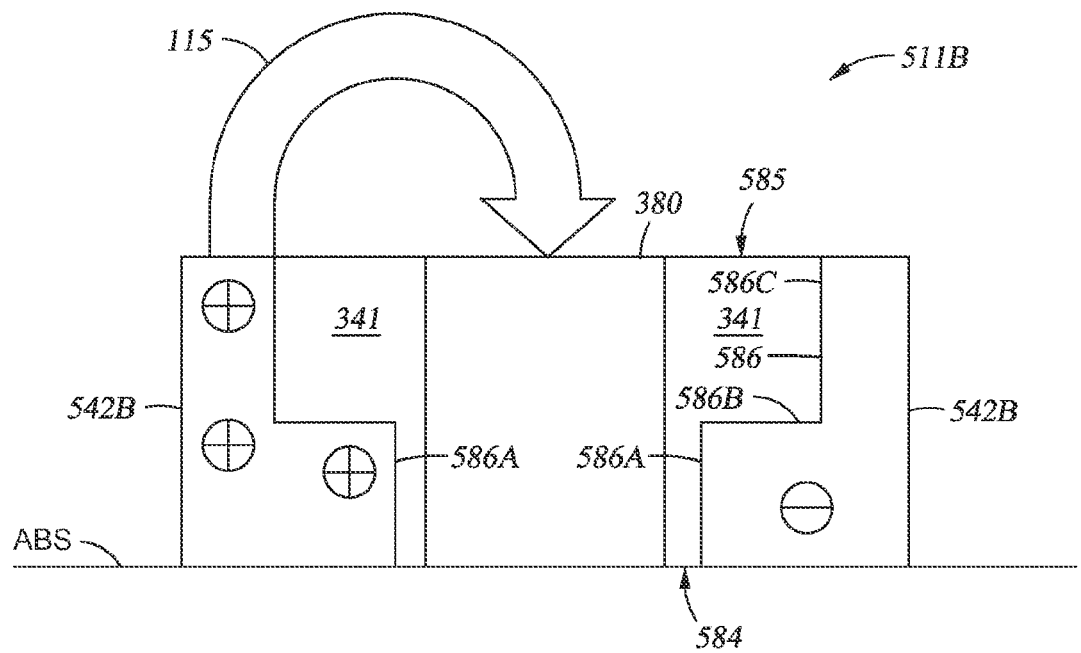

FIG. 5B illustrates a read/write head 511B having a sensor structure 380, side shields 542B, and an insulating layer 341 disposed therebetween. The side shields 542B are similar to the side shields 542A, however, rather than having a tapered edge adjacent to the sensor structure 380, the side shields 542B include a stepped edge 586 adjacent to the shield structure 380. The stepped edge 586 includes a first edge portion 586A adjacent to the ABS and the sensor structure 380. The first edge portion 586A defines a gap 584 between the side shield 542B and the sensor structure 380. The relatively close proximity of the sensor 380 to the first edge portion 586A facilitates a reduction in a skirt ratio. The stepped edge 586 includes a second edge portion 586B perpendicular to the first edge portion and a third edge portion 586C. The first edge portion 586A and the third edge portion 586C are generally parallel to one another. The third edge 586C portion is spaced further away from the sensor structure 380 than is the first edge portion 586A, thus forming gap 585. The relatively larger size of gap 585 allows for increased read output, while the relatively smaller gap 584 facilities a reduced skirt ratio. It is contemplated the second edge portion 586B (e.g., the step) may be positioned at a location about 20 percent to about 80 percent of the length of the stepped edge 586; for example, at about the half way (e.g., 50 percent) point.

Figure 5C:
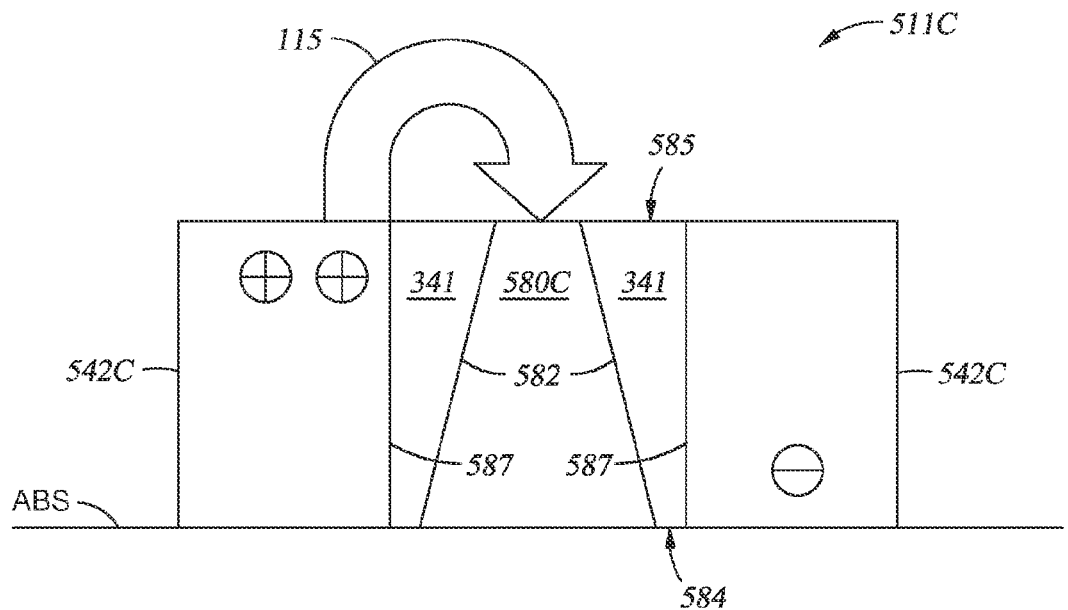

FIG. 5C illustrates a read/write head 511C having a sensor 580C, side shields 542C, and an insulating material 341 disposed in a gap therebetween. The sensor is similar to the sensor structure 380, however, the sensor structure 580C includes edges 582 that are tapered and angled with respect to the edges 587 of the side shields 542C. The edges 587 of the side shields 542C are generally parallel to one another. The edges 582, which are tapered with respect to the edges 587 of the side shields 542C, facilitate formation of a relatively smaller gap 584 between the sensor 582 and the side shields 542C adjacent to the ABS, and relatively larger gap 585 opposite the ABS. The relatively larger size of gap 585 allows for increased read output, while the relatively smaller gap 584 facilities a reduced skirt ratio.

Figure 5D:
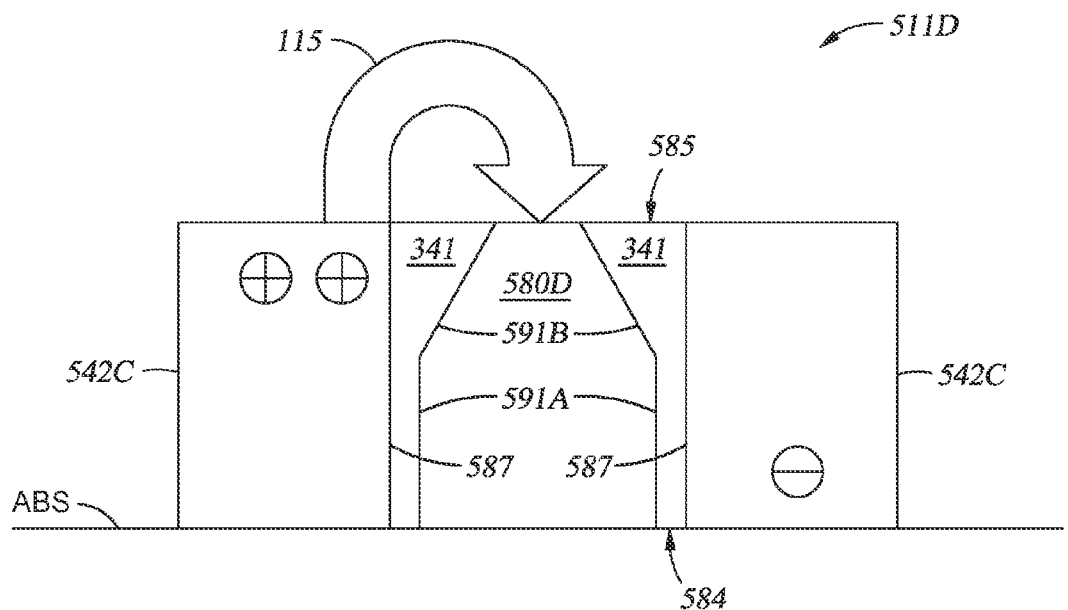

FIG. 5D illustrates a read/write head 511D having a sensor structure 580D, side shields 542C, and an insulating material 341 disposed in a gap therebetween. The sensor 580D includes first edge portions 591A and second edge portions 591B. The edge portions 591A are positioned relatively closer to the side shields 542C as compared to the edge portions 591B, such that a relatively smaller gap 584 is formed adjacent to the ABS. The gap 585 between the sensor 580D and the side shields 542C is opposite the ABS and relatively wider than the gap 584. The second edge portions 591B have are angled or tapered with respect to the edges 587 of the side shield 542C. The first edge portions 591A may be angled with respect to the edges 587, or may be parallel thereto.

As illustrated in FIGS. 5A-5D, either the edges of a sensor structure or the edges of the side shields may be tapered, stepped, or in some embodiments curved, in order to form a smaller gap adjacent the ABS than opposite or away from the ABS. It is to be noted that the step transition in stepped surfaces, and the angle of inclination of tapered surfaces, may be varied as desired. The relatively larger gap opposite the ABS facilitates increased read output, while the relatively smaller gap adjacent the ABS facilities a reduced skirt ratio.

While the foregoing is directed to embodiments of the present invention, other and further embodiments of the invention may be devised without departing from the basic scope thereof, and the scope thereof is determined by the claims that follow.

What is claimed is:

1. A magnetoresistive head, comprising:
    a sensor structure;
    a first side shield disposed on a first side of the sensor structure;
    a second side shield disposed on a second side of the sensor structure;
    wherein the first side shield is spaced from the sensor structure by a first distance at an air bearing surface (ABS) and a second distance at a location spaced from the air bearing surface, wherein the second distance is greater than the first distance; and
    wherein the distance between the first side shield and the sensor structure tapers from the ABS to the location spaced from the air bearing surface further comprising an electrically insulating material disposed between the sensor structure and each of the first side shield and the second side shield.

2. The magnetoresistive head of claim 1, wherein the electrically insulating material includes aluminum oxide.

3. The magnetoresistive head of claim 2, wherein adjacent edges of the first side shield and the second side shield are substantially parallel.

4. A magnetoresistive head, comprising:
    a sensor structure having a first edge and a second edge opposite the first edge;
    a first side shield disposed adjacent the first edge of the sensor structure, wherein the first side shield has a third edge facing the first edge of the sensor structure; and
    a second side shield disposed adjacent the second edge of the sensor structure, wherein the second side shield has a fourth edge facing the second edge of the sensor structure, wherein the first side shield is spaced from the sensor structure by a first distance at an air bearing surface and a second distance at a location spaced from the air bearing surface, wherein the second distance is greater than the first distance, and wherein the third edge of the first side shield and the fourth edge of the second side shield are substantially parallel.

5. The magnetoresistive head of claim 4, wherein the first and second edges of the sensor structure are tapered and angled with respect to the third edge of the first side shield and the fourth edge of the second side shield.

6. The magnetoresistive head of claim 4, further comprising an electrically insulating material disposed between the sensor structure and each of the first side shield and the second side shield.

7. The magnetoresistive head of claim 6, wherein the electrically insulating material includes aluminum oxide.

8. The magnetoresistive head of claim 7, wherein the first and second edges of the sensor structure are tapered and angled with respect to the third edge of the first side shield and the fourth edge of the second side shield.

9. The magnetoresistive head of claim 4, wherein the sensor structure includes an under layer, an antiferromagnetic layer, a pinned magnetic layer, an insulation layer, a free layer and a gap layer.

10. A hard disk drive, comprising:
    a magnetic disk;
    a magnetic write head; and
    a magnetic read head, wherein the magnetic read head comprises:
        a sensor structure having a first edge and a second edge opposite the first edge;
        a first side shield disposed adjacent the first edge of the sensor structure, wherein the first side shield has a third edge facing the first edge of the sensor structure; and
        a second side shield disposed adjacent the second edge of the sensor structure, wherein the second side shield has a fourth edge facing the second edge of the sensor structure, wherein the first side shield is spaced from the sensor structure by a first distance at an air bearing surface and a second distance at a location spaced from the air bearing surface, wherein the second distance is greater than the first distance, and wherein the third edge of the first side shield and the fourth edge of the second side shield are substantially parallel.

11. The hard disk drive of claim 10, wherein the first and second edges of the sensor structure are tapered and angled with respect to the third edge of the first side shield and the fourth edge of the second side shield.

12. The hard disk drive of claim 10, further comprising an electrically insulating material disposed between the sensor structure and each of the first side shield and the second side shield.

13. The hard disk drive of claim 12, wherein the electrically insulating material includes aluminum oxide.

14. The hard disk drive of claim 13, wherein the first and second edges of the sensor structure are tapered and angled with respect to the third edge of the first side shield and the fourth edge of the second side shield.

15. The hard disk drive of claim 10, wherein the sensor structure includes an under layer, an antiferromagnetic layer, a pinned magnetic layer, an insulation layer, a free layer and a gap layer.

* * * * *